(12) United States Patent
Kavosh (10) Patent No.: US 9,132,495 B2
(45) Date of Patent: Sep. 15, 2015

(54) METHOD AND APPARATUS FOR BEAM SOLDERING

(75) Inventor: Iraj Kavosh, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 917 days.

(21) Appl. No.: 12/110,196

(22) Filed: Apr. 25, 2008

(65) Prior Publication Data

US 2009/0266871 A1  Oct. 29, 2009

(51) Int. Cl.
*B23K 1/00* (2006.01)
*B23K 31/02* (2006.01)
*G11B 5/60* (2006.01)
*B23K 1/005* (2006.01)

(52) U.S. Cl.
CPC ............ *B23K 1/0016* (2013.01); *B23K 1/0056* (2013.01)

(58) Field of Classification Search
CPC .................. B23K 26/032; G06F 2203/04104; H01L 2224/75
USPC ............ 360/104, 97.01, 97.02, 234.5, 264.2, 360/245.9, 245, 245.3; 219/85.13, 50, 57, 219/85.1, 85.2, 85.21, 78.02, 80, 86.1, 219/121.6, 121.61, 129, 136, 148, 162, 219/209; 228/234.1, 180.21, 254, 256, 219, 228/101, 111.5, 119, 181.1, 262.31, 262.45, 228/262.51–262.9
See application file for complete search history.

(56) References Cited

U.S. PATENT DOCUMENTS

| | | | |
|---|---|---|---|
| 4,657,169 A * | 4/1987 | Dostoomian et al. | 228/103 |
| 4,831,233 A * | 5/1989 | Gordon | 219/124.34 |
| 4,831,564 A | 5/1989 | Suga | |
| 4,909,429 A | 3/1990 | Ankrom et al. | |
| 5,289,966 A | 3/1994 | Izumi et al. | |
| 5,524,809 A * | 6/1996 | Kosslow et al. | 228/20.5 |
| 5,668,684 A | 9/1997 | Palmer et al. | |
| 5,864,118 A | 1/1999 | Backlund | |
| 5,872,687 A * | 2/1999 | Arya et al. | 360/264.2 |
| 5,899,737 A | 5/1999 | Trabucco | |
| 6,053,398 A | 4/2000 | Iizuka et al. | |
| 6,146,813 A * | 11/2000 | Girard et al. | 430/319 |
| 6,212,046 B1 * | 4/2001 | Albrecht et al. | 360/264.2 |

(Continued)

FOREIGN PATENT DOCUMENTS

JP    10142466    5/1998

OTHER PUBLICATIONS

Goldberg, Gary "Diode laser systems: Next generation non-contact soldering technology", http://www.emasiamag.com/article-2639-diodelasersystemsnextgenerationnoncontactsolderingtechnology-Asia.html, (Sep. 2007),1-3.

(Continued)

*Primary Examiner* — Dana Ross
*Assistant Examiner* — Ket D Dang (57) ABSTRACT

Beam soldering involves using a beam of light emitted from a source to reflow adjoining pairs of solder pads on components being joined. In some scenarios, material between adjacent solder pads on at least one of the components is absorptive of a certain spectrum of light and, consequently, can be damaged by such spectrum of light. A beam soldering tool is configured with a filter through which the light from the light source travels to a plurality of adjoining pairs of solder pads. The filter filters out a certain spectrum of light which could otherwise be damaging to material between adjacent solder pads.

8 Claims, 5 Drawing Sheets

(56) References Cited

U.S. PATENT DOCUMENTS

| | | | |
|---|---|---|---|
| 6,278,562 B1* | 8/2001 | Lovett | 359/886 |
| 6,486,433 B2 | 11/2002 | Grewell et al. | |
| 6,543,677 B2* | 4/2003 | Pattanaik et al. | 228/246 |
| 6,670,570 B2 | 12/2003 | Giacobbe et al. | |
| 6,887,531 B2* | 5/2005 | Hones | 428/1.1 |
| 7,115,841 B2* | 10/2006 | Zeng et al. | 219/476 |
| 7,400,470 B2* | 7/2008 | Matsumoto et al. | 360/234.5 |
| 7,532,749 B2 | 5/2009 | Watanabe et al. | |
| 7,766,213 B2 | 8/2010 | Henrikson | |
| 2002/0088777 A1* | 7/2002 | Grewell et al. | 219/121.63 |
| 2002/0179589 A1* | 12/2002 | Morita et al. | 219/411 |
| 2002/0190035 A1* | 12/2002 | Giacobbe et al. | 219/121.12 |
| 2003/0146018 A1 | 8/2003 | Sinkunas et al. | |
| 2004/0035840 A1* | 2/2004 | Koopmans | 219/209 |
| 2004/0212748 A1* | 10/2004 | Suzuki et al. | 349/8 |
| 2005/0023488 A1* | 2/2005 | Katsuki | 250/504 R |
| 2005/0029326 A1* | 2/2005 | Henrikson | 228/8 |
| 2005/0092723 A1* | 5/2005 | Horsting | 219/121.75 |
| 2005/0103753 A1* | 5/2005 | Watanabe et al. | 219/121.6 |
| 2006/0071052 A1* | 4/2006 | Conlon et al. | 228/103 |
| 2009/0159649 A1* | 6/2009 | Inoue | 228/234.1 |
| 2012/0074110 A1* | 3/2012 | Zediker et al. | 219/121.72 |

OTHER PUBLICATIONS

Mandel, Richard "Micro-Soldering System Flows with Light", http://www.manufacturingcenter.com/med/archives/0997/997dd.html, (Sep. 1997),1.

Perkinelmer, "Xenon Lighting Center Cermax Brand Xenon Lamps", http://www.alphasource.com/products/lamps/xenon/perkin.cfm, (2002),1-2.

* cited by examiner

METHOD AND APPARATUS FOR BEAM SOLDERING

TECHNICAL FIELD

Embodiments of the invention relate generally to the field of hard disk drives and, more specifically, to beam soldering techniques using a wavelength filter.

BACKGROUND ART

Electronic computing devices have become increasingly important to data computation, analysis and storage in our modern society. Modern direct access storage devices (DASDs), such as hard disk drives (HDDs), are heavily relied on to store mass quantities of data for purposes of future retrieval. As such long term data storage has become increasingly popular, and as the speed of microprocessors has steadily increased over time, the need for HDDs with greater storage capacity to store the increased amount of data has also steadily increased.

A hard disk drive assembly process typically involves some solder joining of components. In this joining process a plurality of preformed solder pads are joined in pairs to provide electrical contact between the components. For example, one could utilize a xenon lamp-based soldering system for such a soldering process. With the soldering process, a beam of light is focused on an area that covers a plurality of preformed solder pads on the components being joined, for simultaneous joining of the two components at multiple sites. During the beam soldering process, all the target pad sites as well as the areas between the pads are indiscriminately exposed to focused light.

Areas of one or both components, between and around adjacent solder pads, may be coated with materials that have strong absorption in a certain wavelength range(s) of the light spectrum emitted by the soldering light source. Absorption of the light energy at these certain wavelengths could damage the coating material or cause swelling, bubbling, and carbonization in the coating material. Furthermore, lead-free soldering processes require a higher melting temperature process and, therefore, require more power delivery to the target pads. This in turn further exposes the coating material to damage during the beam soldering process.

The foregoing phenomena are not limited to xenon lamps because other lamps used in soldering applications and which emit harmful wavelengths to surrounding materials, depending on the light absorption characteristics of the material, could have a similar detrimental effect on such materials. Based on the foregoing, there is a need for an approach to beam soldering which avoids damage to areas around the solder pads on the components being soldered.

SUMMARY OF EMBODIMENTS OF THE INVENTION

A method and apparatus for beam soldering components using a beam of light are described; where the beam of light is emitted from a source to reflow adjoining pairs of solder pads on the components being joined. Material between adjacent solder pads on at least one of the components is absorptive of a certain spectrum of light and, consequently, can be damaged by such spectrum of light. For a non-limiting example, a beam soldering tool may comprise a xenon lamp as the soldering energy source, which emits light in the UV range, among other wavelengths. Continuing with the example, polyimide materials are often used to coat some components in a hard disk drive device and generally absorb light in the UV and violet range of the light spectrum. Consequently, during a soldering process, the polyimide coating between adjacent solder pads may be damaged by UV light from the xenon lamp which emits such light at a power level required for the intended soldering process.

According to an embodiment, a beam soldering tool is configured with a filter through which the light from the light source travels to a plurality of adjoining pairs of solder pads. Significantly, the filter filters out a certain spectrum of light which could otherwise be damaging to material between and/or around adjacent solder pads. According to an embodiment, the filter is readily removable and exchangeable so that different filters may be configured as might be needed for different scenarios. That is, if different soldering scenarios require different wavelengths to be filtered out, e.g., for different component materials and/or different light source spectrums, the beam soldering tool configuration is flexible to meet such varying needs.

BRIEF DESCRIPTION OF THE DRAWINGS

The accompanying drawings, which are incorporated in and form a part of this specification, illustrate embodiments of the invention and, together with the description, serve to explain the principles of the invention. The drawings are used merely to illustrate principles of the illustrated embodiments, and it is understood that components described in these embodiments have not been drawn to scale.

DETAILED DESCRIPTION OF EMBODIMENTS OF THE INVENTION

Reference will now be made in detail to embodiments of the present technology, examples of which are illustrated in the accompanying drawings. While the technology is described in conjunction with various embodiments, it should be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description of embodiments, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

Although embodiments of the present invention will be described in conjunction with xenon lamp-based beam soldering of an integrated lead suspension with a flexible electrical cable, it should be understood that the embodiments described herein are useful outside of the art of HDD design, manufacturing and operation. The utilization of the HDD example is only one embodiment and is provided herein merely for purposes of brevity and clarity.

Hard Disk Drive (HDD) Configuration

Figure 1:
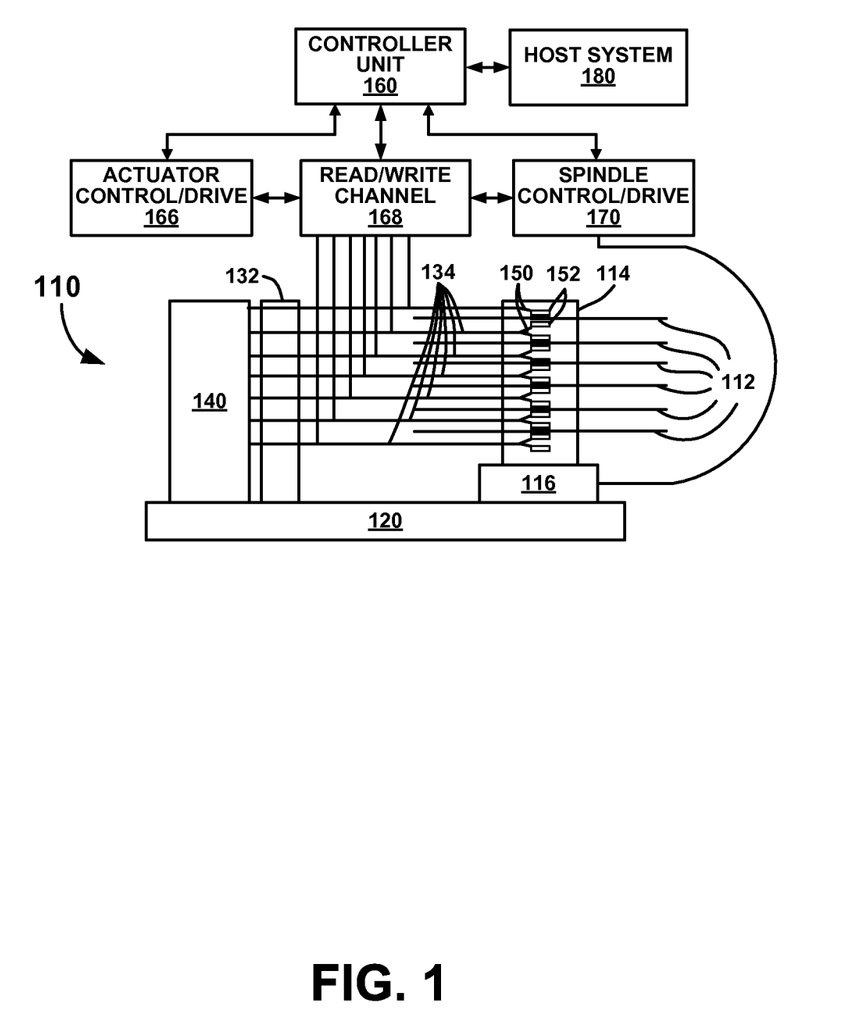
FIG. 1 illustrates a side view of a disk drive system, according to an embodiment of the invention.
Figure 2:
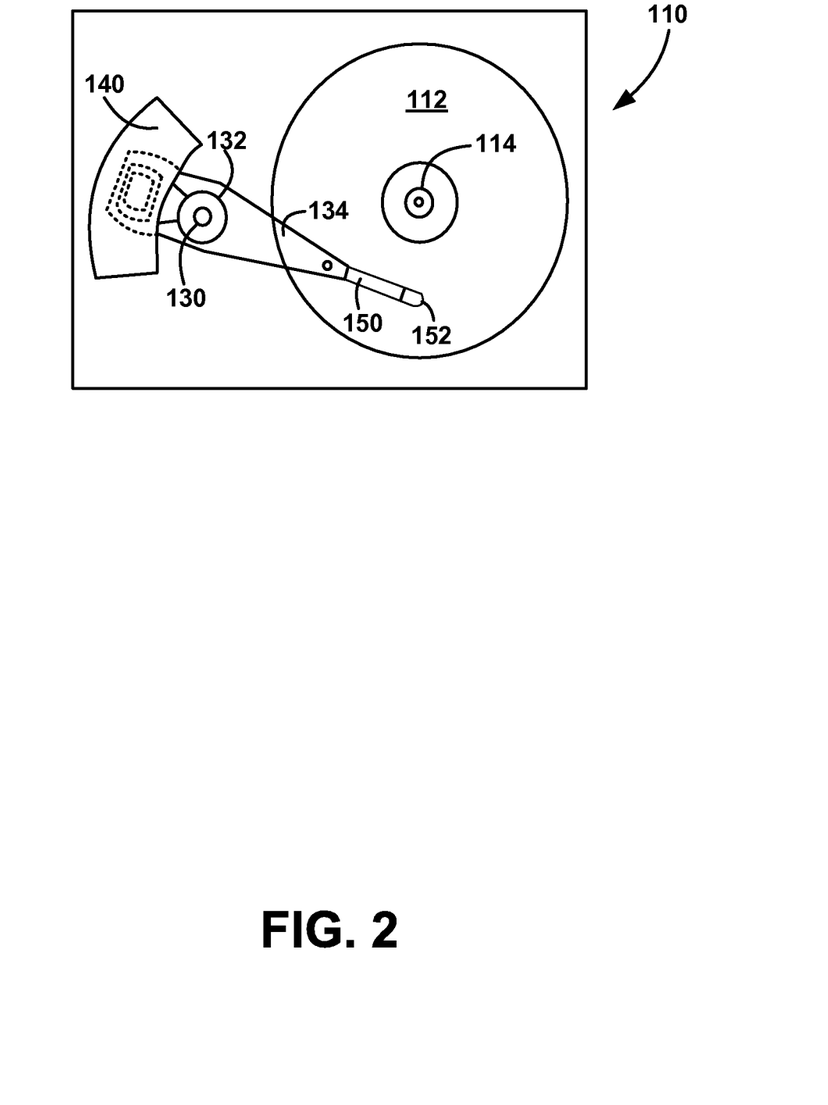
FIG. 2 illustrates a top view of a disk drive system, according to an embodiment of the invention.

FIG. 1 and FIG. 2 show a side view and a top view, respectively, of a disk drive system designated by the general reference number 110. The disk drive system 110 comprises a plurality of stacked magnetic recording disks 112 mounted to a spindle 114. The disks 112 may be conventional thin film recording disks or other magnetically layered disks. The spindle 114 is attached to a spindle motor 116, which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. A rotary voice coil motor 140 is attached to chassis 120 and to a rear portion of the actuator arms 134.

A plurality of integrated lead suspensions (ILS) 150 are attached to the actuator arms 134. A plurality of heads or transducers on sliders 152 are attached respectively to the suspensions 150. The sliders 152 are located proximate to the disks 112 so that, during operation, the heads or transducers are in electromagnetic communication with the disks 112 for reading and writing. The rotary voice coil motor 140 rotates actuator arms 134 about the actuator shaft 130 in order to move the suspensions 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that one skilled in the computer arts could also enable these aspects as hardware logic. Controller unit 160 is connected to an actuator control/drive unit 166 that in turn is connected to the rotary voice coil motor 140. This configuration also allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

Figure 3:
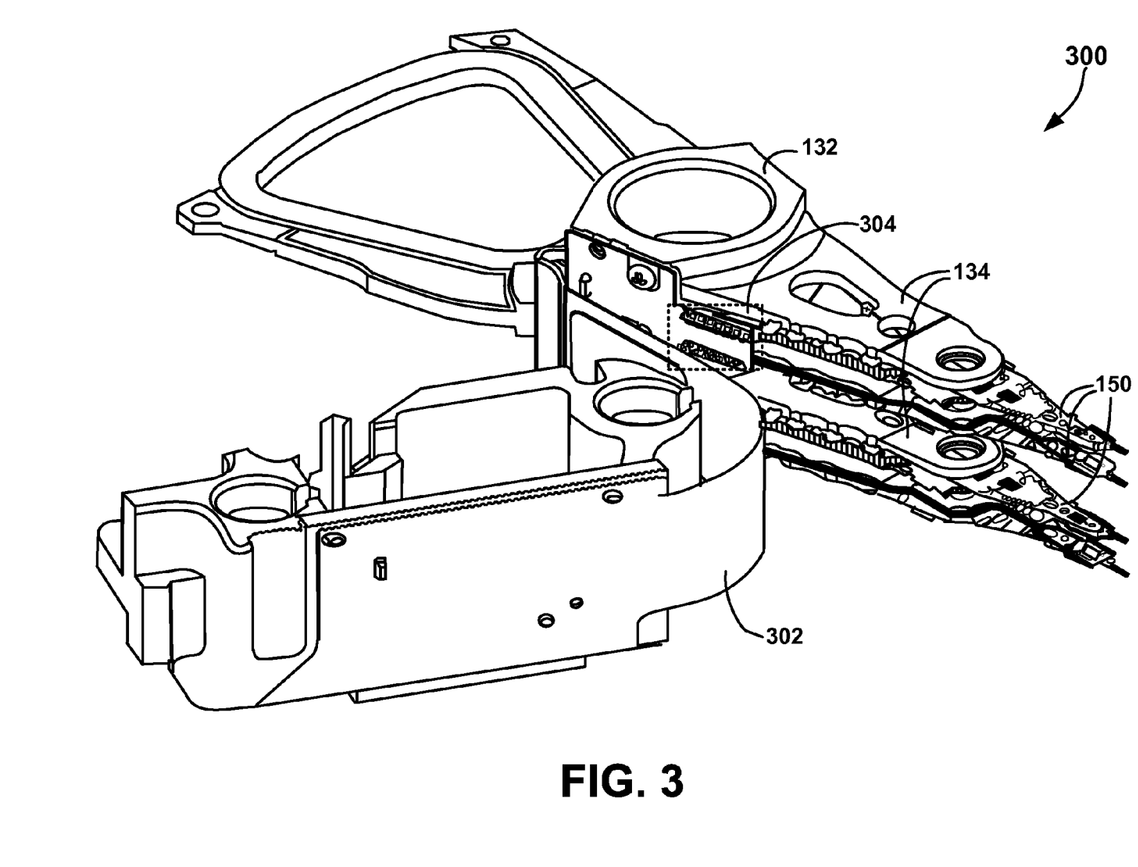
FIG. 3 is a perspective view of an example head stack assembly (HSA) of a hard disk drive device, according to an embodiment of the invention.

FIG. 3 is a perspective view of an example head stack assembly (HSA) 300 of a hard disk drive device, according to an embodiment of the invention. Hard disk drive devices include a head stack assembly which typically comprises a plurality of integrated lead suspensions 150 attached to a respective actuator arm 134. The HSA assembly process involves a solder joining of integrated lead suspension(s) (ILS) 150 with a flexible ("flex") electrical cable 302. In this joining process a plurality of pre-formed solder pads are joined in pairs to provide electrical contact between the ILS 150 and the flex cable 302. See the dashed box 304 for an example of a location at which ILS 150 is solder joined with flex cable 302.

Figure 4:
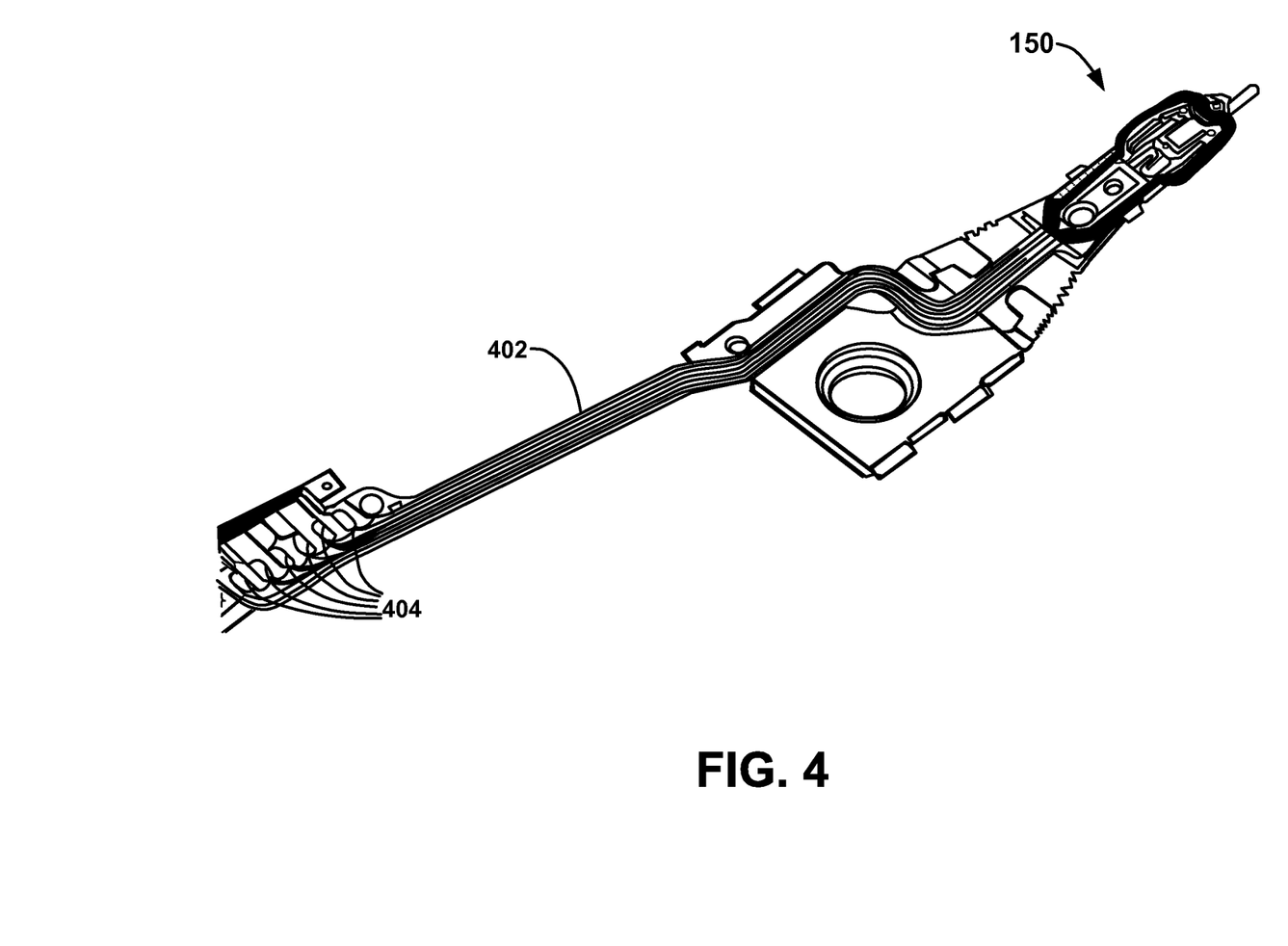
FIG. 4 is a perspective view of an integrated lead suspension (ILS) of a hard disk drive device, according to an embodiment of the invention.

FIG. 4 is a perspective view of an integrated lead suspension (ILS) 150 of a hard disk drive device, according to an embodiment of the invention. ILS 150 comprises a plurality of electrical leads 402 routed from sliders 152 (FIGS. 1 and 2) to a plurality of conductive solder pads 404.

Beam Soldering of ILS and Flex Cable

As mentioned, xenon-based and other lamps are commonly used in beam soldering processes. With a xenon lamp-based beam soldering process, a beam of xenon light is focused on an area that covers a plurality of preformed solder pads on the ILS 150 (e.g., solder pads 404) and the flex cable 302, for simultaneous joining of the ILS 150 and the flex cable 302 at multiple sites. During the beam soldering process, typically all the target pad sites as well as the areas between the pads are indiscriminately exposed to focused xenon light.

According to an embodiment, areas of the flex cable 302 and/or of an ILS 150 stiffener, between and around adjacent solder pads, are coated with polyimide (and adhesive) materials that have strong absorption in the UV range. Absorption of UV, and even violet and blue wavelengths, could damage the polyimide coating or cause swelling, bubbling, and carbonization in the polyimide material. Carbonization, for example, can cause electrical shorts between adjacent pads and can cause contamination which could be released inside the HDD device.

Because the spectral output of xenon lamps covers a wide range of wavelengths that spans from UV to visible and near-infrared wavelengths (with a high contribution in the 800-1000 nm range), certain wavelengths from a xenon lamp are strongly absorbed by the polyimide material coating and, therefore, could be harmful to the coating. Furthermore, the contribution of UV light to the xenon total output light is even more in a new lamp because the emission spectrum of an aged light is different than the emission spectrum of a new light, i.e., the spectrum shifts with use over time. That is, the irradiance of UV wavelengths decreases with use while the irradiance increases for visible and IR wavelengths. Therefore, there is more UV contribution to the total power with a new xenon bulb than with an aged xenon bulb. Consequently, it is challenging to maintain over time a balance between the power output of a xenon lamp in view of its propensity for damaging the polyimide coating of the ILS 150 and/or flex cable 302 with the potential for a compromised electrical interconnection caused by insufficient power. For example, if attempting to moderate the deleterious effect of the UV wavelengths to the polyimide coating by moderating the lamp power output, one would need to repeatedly adjust the power output over time to account for the lamp aging effect.

Still further, lead-free soldering processes require a higher melting and reflow temperature than lead-based soldering processes and, therefore, require more power delivery to the target in order to reflow the preformed solder pads. For example, leaded solder (Sn63Pb37) has a melting temperature of approximately 183° C. and lead-free solder (Sn95.5Ag3.8Cu0.7) has a melting temperature of approximately 217° C. This increase in power delivery, required for a proper soldering process, in turn further exposes the polyimide material to damage during the beam soldering process.

Those skilled in the art should recognize that the foregoing phenomena are not limited to xenon lamps, because other lamps used in soldering applications and which emit harmful wavelengths to surrounding materials could have a similar detrimental effect on such materials. Additionally, those skilled in the art should recognize that the foregoing phenomena are not limited to an ILS-flex cable solder joint, because materials between and/or around solder pads on other components could suffer a similar detrimental effect based on certain wavelengths emitted from the beam soldering light source. Hence, the type of lamp, the solder pad-adjacent materials, and the components being soldered according to the following process can all vary from implementation to implementation.

Beam Soldering with a Wavelength Filter

Figure 5:
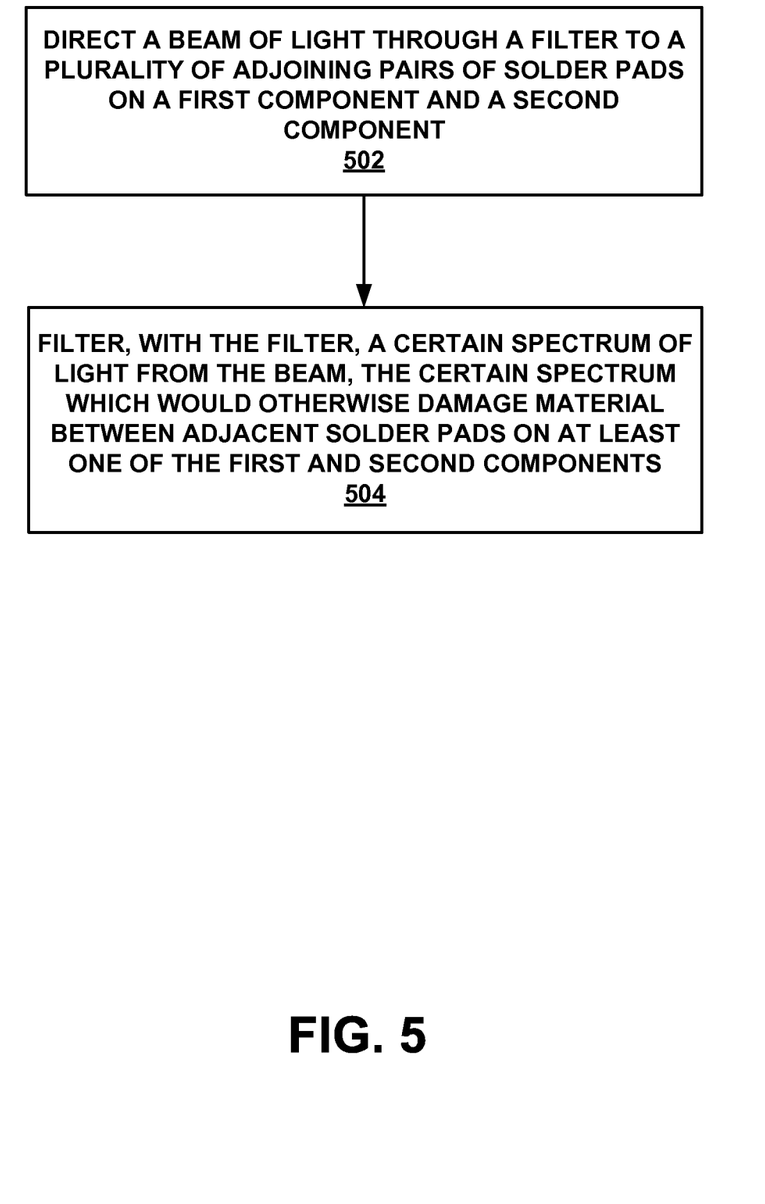
FIG. 5 is a flow diagram illustrating a process for beam soldering, according to an embodiment of the invention.

FIG. 5 is a flow diagram illustrating a process for beam soldering, according to an embodiment of the invention. The beam soldering process is used to solder a first component to a second component using a beam of light emitted from a light source to reflow adjoining pairs of solder pads on the first and second components. Further, material between adjacent solder pads on at least one of the first and second components is absorptive of a certain spectrum of the light used for reflowing the solder pads. According to an embodiment, the light source is a xenon light source, such as a xenon lamp. According to an embodiment, the first and second components are an integrated lead suspension, such as ILS 150 (FIGS. 1-4), and a flexible cable, such as flex cable 302 (FIG. 3).

At block 502, a beam of light is directed through a filter to a plurality of the adjoining pairs of solder pads on the first component and the second component. At block 504, the filter filters out a certain spectrum of light from the beam, where the certain spectrum would otherwise damage, via absorption, the material between adjacent solder pads on the at least one of the first and second components.

As discussed, the material between and/or around the solder pads is absorbent of particular wavelengths of light. Similarly, this material mostly transmits other particular wavelengths of light and, therefore, allows these other wavelengths of light to travel through and into any underlying material. According to an embodiment, the material between and/or around the solder pads is a polyimide (e.g., a polyimide film coating), which strongly absorbs light in the ultraviolet (UV), violet, and blue range, and transmits light in the longer visible and infrared (IR) wavelengths. Because of this absorption of the UV wavelengths, primarily, and to some extent the violet and blue wavelengths, the polyimide can be significantly damaged when targeted with such wavelengths. For example, the damaging light can cause swelling, bubbling, and carbonization of the polyimide, thereby compromising the electrical interconnection enabled by the solder joint.

In order to eliminate or at least minimize any damage caused by the certain spectrum of light to the surrounding material, a filter is selected or designed based on the wavelengths of light which it is able to filter out, in view of the wavelengths that are damaging to the particular surrounding material. For example, a high-pass filter may be used to limit the light that passes through to a certain range of longer (higher) wavelengths and, therefore, absorbing or reflecting a certain range of shorter wavelengths. Thus, the particular filter configured with a beam soldering tool may vary from implementation to implementation, depending on the light spectrum emitted by the light source and the material adjacent to and/or near the target solder pads.

According to an embodiment, filtering at block 504 comprises filtering wavelengths shorter than approximately 440-480 nm. This range corresponds to UV, violet, blue light, which are emitted from a non-filtered xenon lamp and which are damaging to polyimide materials. Such a configuration eliminates strong absorption of UV and violet light by a polyimide coating, such as a polyimide coating used in a flex cable and/or ILS.

According to an embodiment, the filter is removable and exchangeable from a beam soldering tool, so that a change in needs does not require an entire new beam soldering power (i.e., light) source but simply an exchange of filters. The manner in which a selective filter is exchangeably coupled to a light fixture housing the light source is not limited and may vary from implementation to implementation depending, for example, on the configuration of the fixture and/or beam soldering tool. For a non-limiting example, if the fixture outlet of the beam soldering tool is threaded, then filters can be readily exchanged by unscrewing and screwing with the fixture. For another non-limiting example, if the fixture of the beam soldering tool comprises a slot for housing filters, then filters can be readily exchanged by removing from and replacing within the fixture slot.

As discussed, xenon lamps experience a spectral shift based on use over time. That is, the relative amount of power emitted by the lamp at most of the UV-range wavelengths decreases with use. With use of the beam soldering selective light filtering techniques described herein, lamp aging does not affect the beam soldering process. That is, the process does not need to be repeatedly modified because the repeated balancing over time of the power output of a xenon lamp in view of its propensity for damaging the polyimide coating with the potential for a compromised electrical interconnection caused by insufficient power, no longer needs to be maintained as it did with prior approaches. Thus, the described techniques provide a wider process window for delivering more energy (with no UV component) to target interconnections with less possibility of burning of polyimide coating.

As discussed, lead-free soldering processes require a higher melting and reflow temperature than lead-based soldering processes and, therefore, require more power delivery to the target in order to reflow the preformed solder pads. Application of more power, in an unfiltered scenario, increases the likelihood of damaging the material adjacent to and/or around the preformed solder pads. However, with use of the beam soldering selective filtering techniques described herein in the context of lead-free solders, more power can be applied during the beam soldering process without a need for modifying or replacing the light source equipment and without a consequent increased likelihood of damage to the surrounding material.

Based on the foregoing, it should be understood by those skilled in the art that various embodiments of the invention increase the performance quality of a hard disk drive by enhancing the reliability of ILS-flex cable electrical interconnections and, therefore, the reliability of the HDD. Further, it should be understood that although various embodiments of the present invention are described in the context of an ILS-flex cable solder joint in an HDD, the foregoing embodiments are merely examples of various implementations of principles of the present technology. Therefore, it should be understood that various embodiments of the invention described herein may apply to any devices, configurations, or systems with which a beam soldering process is employed.

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for beam soldering a first component to a second component using a beam of light emitted from a light source to reflow adjoining pairs of solder pads on said first component and said second component, wherein material between adjacent solder pads on at least one of said first and said second components is absorptive of a spectrum of said light, the method comprising:

directing said beam of light through a filter to a plurality of said adjoining pairs of solder pads on said first component and said second component wherein said filter is exchangeably connected to a beam fixture; and     filtering wavelengths shorter than approximately 440-480 nm from said beam, to remove wavelengths which would otherwise damage, via absorption, said material between adjacent solder pads on at least one of said first and said second components.

2. The method recited in claim 1, wherein filtering comprises filtering said certain spectrum of light from a xenon light source.

3. The method of claim 1, wherein filtering comprises filtering said certain spectrum of light from a xenon lamp light source.

4. The method of claim 1, wherein filtering comprises filtering said certain spectrum of light which would otherwise damage a polyimide material between adjacent solder pads.

5. The method of claim 1, wherein directing comprises directing said beam of light to the plurality of adjoining pairs of solder pads on an integrated lead suspension and a flexible cable which are components of a hard disk drive device.

6. The method of claim 1, wherein directing comprises directing said beam of light through a removable and exchangeable filter.

7. The method of claim 1, wherein directing comprises directing said beam of light to a plurality of adjoining pairs of lead-free solder pads.

8. The method of claim 1, wherein directing comprises directing said beam of light to the plurality of adjoining pairs of solder pads to form an electrical interconnection between said first and second components.

* * * * *